United States Patent
Kaufman

(10) Patent No.: US 8,706,635 B2
(45) Date of Patent: Apr. 22, 2014

(54) USE OF LICENSED CONTENT WITHOUT IDENTIFICATION THEREOF

(75) Inventor: Charles William Kaufman, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1483 days.

(21) Appl. No.: 11/247,751

(22) Filed: Oct. 11, 2005

(65) Prior Publication Data

US 2007/0083469 A1     Apr. 12, 2007

(51) Int. Cl.
*G06F 21/00* (2013.01)

(52) U.S. Cl.
USPC ............ 705/51; 705/52; 705/53; 705/59; 705/902; 705/904; 705/908; 705/909; 705/910; 380/200; 380/231

(58) Field of Classification Search
USPC ......... 705/51, 52, 59, 53, 902, 904, 908, 909, 705/910; 380/231, 200
See application file for complete search history.

(56) References Cited

U.S. PATENT DOCUMENTS

| | | | |
|---|---|---|---|
| 4,759,063 A | 7/1988 | Chaum | 380/30 |
| 5,892,900 A * | 4/1999 | Ginter et al. | 726/26 |
| 7,162,639 B1 * | 1/2007 | Bleumer | 713/180 |
| 7,272,582 B2 * | 9/2007 | Rust | 705/50 |
| 2002/0161997 A1 * | 10/2002 | Yamasaki et al. | 713/150 |
| 2003/0135464 A1 * | 7/2003 | Mourad et al. | 705/50 |

OTHER PUBLICATIONS

Alfred J. Menezes, "Handbook of Applied Cryptography", 1997, CRC Press LLC, pp. 286 and 287.*
RSA Crypto Online FAQ—Jul. 2001.*
Bleumer, G., "Blind signature," Need Journal, 2004, 4 pages.
"Blind signature," Wikipedia, the free encyclopedia, http://en.wikipedia.org/wiki/Blind_signature, downloaded from the internet on Sep. 7, 2005, 2 pages.
"What is the RSA cryptosystem?," RSA Laboratories, Chapter 3.1.1, http://www.rsasecurity.com/rsalabs/node.asp?id=2214, downloaded from the internet on Sep. 7, 2005, 2 pages.
"How fast is the RSA algorithm?," RSA Laboratories, Chapter 3.1.2, http://www.rsasecurity.com/rsalabs/node.asp?id=2215, downloaded from the internet on Sep. 7, 2005, 2 pages.
"What would it take to break the RSA cryptosystem?," RSA Laboratories, Chapter 3.1.3, http://www.rsasecurity.com/rsalabs/node.asp?id=2216, downloaded from the internet on Sep. 7, 2005, 2 pages.

(Continued)

*Primary Examiner* — Steven Kim
(74) *Attorney, Agent, or Firm* — Ben Tabor; Kate Drakos; Micky Minhas

(57) ABSTRACT

A content key (CK) to decrypt a piece of encrypted content is obtained encrypted according to a public key of a licensor (PU-L) to result in (PU-L(CK)). (PU-L(CK)) is obscured according to (PU-L) and a value R to result in Obs (PU-L (CK)), and Obs (PU-L(CK)) is sent to the licensor, which applies a private key (PR-L) corresponding to (PU-L) to Obs (PU-L(CK)) to result in Obs (CK) as an obscured version of (CK). Obs (CK) is received from the licensor; and (CK) is obtained from Obs (CK) based on applying R thereto. The licensor cannot identify from Obs (PU-L(CK)) or from Obs (CK) the encrypted content or the content key (CK) from which the encrypted content may be identified.

16 Claims, 6 Drawing Sheets

(56) References Cited

OTHER PUBLICATIONS

"What are strong primes and are they necessary for the RSA system?," RSA Laboratories, Chapter 3.1.4, http://www.rsasecurity.com/rsalabs/node.asp?id-2217, downloaded from the internet on Sep. 7, 2005, 2 pages.

"How large a key should be used in the RSA cryptosystem?," RSA Laboratories, Chapter 3.1.5, http://www.rsasecurity.com/rsalabs/node.asp?id=2218, downloaded from the internet on Sep. 7, 2005, 2 pages.

"Could users of the RSA system run out of distinct primes?," RSA Laboratories, Chapter 3.1.6, http://www.rsasecurity.com/rsalabs/node.asp?id=2219, downloaded from the internet on Sep. 7, 2005, 2 pages.

"How is the RSA algorithm used for privacy in practice?," RSA Laboratories, Chapter 3.1.7, http://www.rsasecurity.com/rsalabs/node.asp?=2220, downloaded from the internet on Sep. 7, 2005, 2 pages.

"How is the RSA algorithm used for authentication and digital signatures in practice?," RSA Laboratories, Chapter 3.1.8, http://www.rsasecurity.com/rsalabs/node.asp?id-2221, downloaded from the internet on Sep. 7 2005, 2 pages.

"Is the RSA cryptosystem currently in use," RSA laboratories, Chapter 3.1.9, http://www.rsasecurity.com/rsalabs/node.asp?id=2222, downloaded from the internet on Sep. 7, 2005, 2 pages.

"Is the RSA system an official standard today?," RSA Laboratories, Chapter 3.1.10, http://www.rsasecurity.com/rsalabs/node.asp?id=2223, downloaded from the internet on Sep. 7, 2005, 2 pages.

"Is the RSA system a de facto standard?," RSA Laboratories, Chapter 3.1.11, http://www.rsasecurity.com/rsalabs/node.asp?id=2224, downloaded from the internet on Sep. 7, 2005, 2 pages.

* cited by examiner

USE OF LICENSED CONTENT WITHOUT IDENTIFICATION THEREOF

TECHNICAL FIELD

The present invention relates to a rights management (RM) system whereby access to digital content is provided only in accordance with a corresponding digital license or the like. More particularly, the invention relates to such an RM system that allows digital content to be employed by a user without specifically identifying the content to a provider or licensor thereof, whereby the user is provided with a degree of privacy regarding such use.

BACKGROUND OF THE INVENTION

Rights management (RM) and enforcement is highly desirable in connection with digital content such as digital audio, digital video, digital text, digital data, digital multimedia, etc., where such digital content is to be distributed to one or more users. Digital content could be static, such as a text document, for example, or it could be streamed, such as the streamed audio and video of a multimedia presentation. Typical modes of distribution of such content include tangible and intangible forms such as an optical disk, a cable-access feed, a feed from an electronic network such as the Internet, a feed from an over-the-air broadcast, etc. Upon being received by a user at an appropriate computing device thereof, such user renders the digital content with the aid of the computing device, appropriate rendering software, and appropriate output devices such as speakers, a video monitor, etc.

In one scenario, the content is distributed as a stream by a distributor as part of a pay-per-use service, such as for example an on-command digital television service, and the streamed content as distributed is protected by for example being encrypted. In another scenario, the content is distributed as a file by a distributor by any appropriate communications medium, such as for example a computer communications network, and the file of content as distributed is again protected by for example being encrypted. In either scenario, then, the user provides to a licensing service such as a licensor or the like a request including relevant data regarding the content and an appropriate form of payment. Upon accepting the payment, then, the licensor returns to the requesting user a content key (CK) by which the encrypted content may be decrypted by such user.

Typically, inasmuch as symmetric encryption and decryption is easier, faster, and less expensive than asymmetric encryption and decryption, the content key (CK) is symmetric. Also typically, the content key (CK) is returned by the licensor to the requesting user in a form so that such content key (CK) is available only to such user. For example, such content key (CK) can be provided to the user in an encrypted form and as part of a digital license or the like that specifies license rules that must be satisfied before such content is allowed to be decrypted and rendered by the user by way of an appropriate media system.

It is to be recognized that in some circumstances a user of such an RM system would prefer not to identify the content to be consumed thereby, both to the licensor and to those who may be able to access data maintained by the licensor. That is, such a user as a matter of privacy may wish to request the content key (CK) to render a particular piece of content without in fact identifying the content to the licensor returning such content key (CK). Reasons for avoiding such identification are many and varied and need not be set forth herein in any detail, although it is to be appreciated that such reasons could for example be grounded in avoiding embarrassment and/or humiliation that could result from such identification.

At any rate, it is to be appreciated that avoiding such identification of such content requires not only avoiding providing the name or any other identification of the content, but also avoiding providing any indicia that may lead to an identification of the content. For example, and most pertinent to the present disclosure, a user requesting from a licensor a particular content key (CK) corresponding to a particular piece of content could identify the content key (CK) only and not the corresponding content in an attempt to avoid identifying and being associated with such content. However, in identifying the content key (CK), it likely would not be difficult for the licensor to identify the corresponding content based on such identified content key (CK), and in doing so to associate the user with the content.

A need exists then, for a system and method to provide a user with some measure of privacy by allowing such user to request from a licensor a content key (CK) for a piece of content without identifying the content key (CK) or the content. In particular, a need exists for a method by which the requesting user sends to the licensor as part of a request an encrypted form of the content key (CK) in an obscured form that is unrecognizable to the licensor and yet that allows the licensor to decrypt the encrypted content key (CK) into a decrypted yet still obscured form that remains unrecognizable to the licensor. Thus, although the licensor decrypts same to result in the content key (CK), such decryption never results in the content key (CK) in a form identifiable to the licensor. As a result, the licensor cannot associate the content key (CK) and by extension the requesting user to a particular piece of content. Nevertheless, the licensor can note that the requesting user did in fact obtain a content key (CK) for some piece of content.

SUMMARY OF THE INVENTION

The aforementioned needs are satisfied at least in part by the present invention in which a method is provided in connection with a piece of encrypted digital content to allow a user to obtain a content key (CK) to decrypt the encrypted content. In the method, (CK) is obtained encrypted according to a public key of a licensor (PU-L) to result in (PU-L(CK)), and also (PU-L) itself is obtained. A value R is selected, which may be a random value or some other value selected by the user, and (PU-L(CK)) is obscured according to (PU-L) and R to result in Obs (PU-L(CK)).

Obs (PU-L(CK)) is sent to the licensor, which applies a private key (PR-L) corresponding to (PU-L) to Obs (PU-L (CK)) to result in Obs (CK) as an obscured version of (CK). Obs (CK) is thereafter received from the licensor; and (CK) is obtained from Obs (CK) based on applying R thereto. Significantly, the licensor cannot identify from Obs (PU-L(CK)) or from Obs (CK) the encrypted content or the content key (CK) from which the encrypted content may be identified.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF THE INVENTION

Computer Environment

Figure 1:
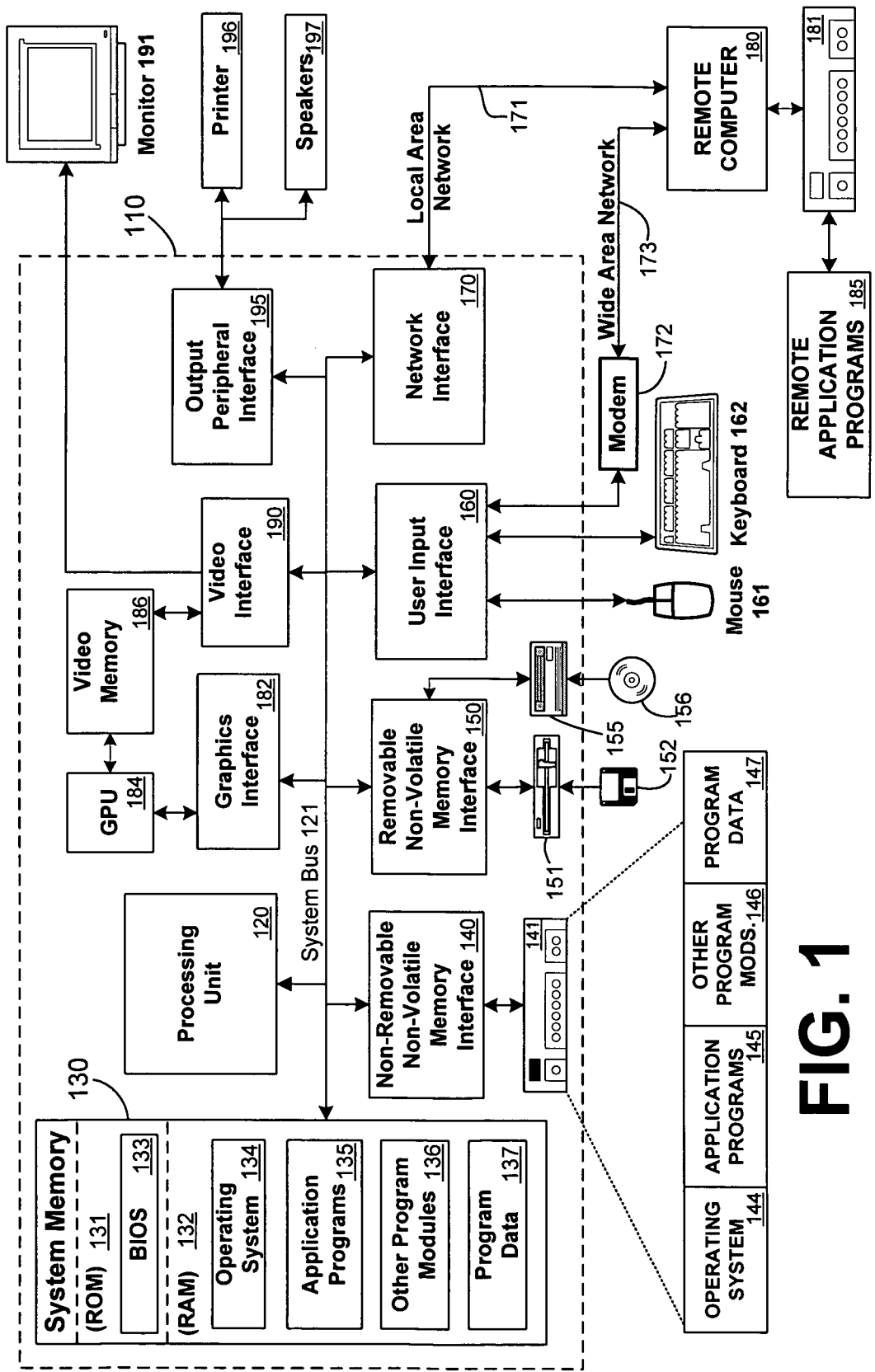
FIG. 1 is a block diagram representing an exemplary non-limiting computing environment in which the present invention may be implemented.

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of co-processing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Distributed computing facilitates sharing of computer resources and services by direct exchange between computing devices and systems. These resources and services include the exchange of information, cache storage, and disk storage for files. Distributed computing takes advantage of network connectivity, allowing clients to leverage their collective power to benefit the entire enterprise. In this regard, a variety of devices may have applications, objects or resources that may interact to implicate authentication techniques of the present invention for trusted graphics pipeline(s).

Figure 2:
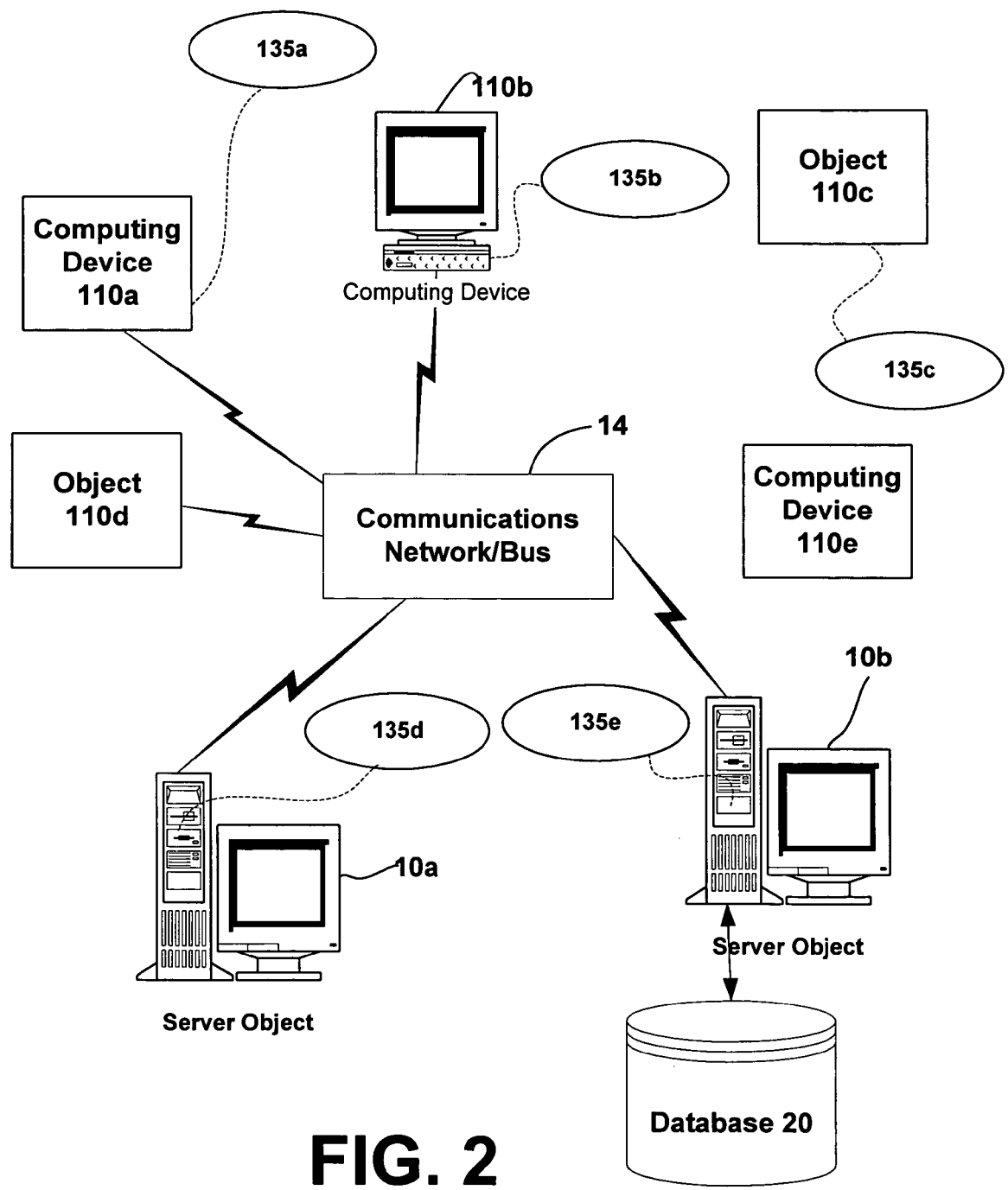
FIG. 2 is a block diagram representing an exemplary network environment having a variety of computing devices in which the present invention may be implemented.

FIG. 2 provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, televisions, MP3 players, televisions, personal computers, etc. Each object can communicate with another object by way of the communications network 14. This network may itself comprise other computing objects and computing devices that provide services to the system of FIG. 2. In accordance with an aspect of the invention, each object 10 or 110 may contain an application that might request the authentication techniques of the present invention for trusted graphics pipeline(s).

It can also be appreciated that an object, such as 110c, may be hosted on another computing device 10 or 110. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wireline or wireless systems, by local networks or widely distributed networks. Currently, many of the networks are coupled to the Internet, which provides the infrastructure for widely distributed computing and encompasses many different networks.

In home networking environments, there are at least four disparate network transport media that may each support a unique protocol such as Power line, data (both wireless and wired), voice (e.g., telephone) and entertainment media. Most home control devices such as light switches and appliances may use power line for connectivity. Data Services may enter the home as broadband (e.g., either DSL or Cable modem) and are accessible within the home using either wireless (e.g., HomeRF or 802.11b) or wired (e.g., Home PNA, Cat 5, even power line) connectivity. Voice traffic may enter the home either as wired (e.g., Cat 3) or wireless (e.g., cell phones) and may be distributed within the home using Cat 3 wiring. Entertainment media may enter the home either through satellite or cable and is typically distributed in the home using coaxial cable. IEEE 1394 and DVI are also emerging as digital interconnects for clusters of media devices. All of these network environments and others that may emerge as protocol standards may be interconnected to form an intranet that may be connected to the outside world by way of the Internet. In short, a variety of disparate sources exist for the storage and transmission of data, and consequently, moving forward, computing devices will require ways of protecting content at all portions of the data processing pipeline.

The 'Internet' commonly refers to the collection of networks and gateways that utilize the TCP/IP suite of protocols, which are well-known in the art of computer networking. TCP/IP is an acronym for "Transport Control Protocol/interface Program." The Internet can be described as a system of geographically distributed remote computer networks interconnected by computers executing networking protocols that allow users to interact and share information over the networks. Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer e.g., a server. In the example of FIG. 2, computers 110a, 110b, etc. can be thought of as clients and computer 10a, 10b, etc. can be thought of as the server where server 10a, 10b, etc. maintains the data that is then replicated in the client computers 110a, 110b, etc.

A server is typically a remote computer system accessible over a remote network such as the Internet. The client process may be active in a first computer system, and the server process may be active in a second computer system, communicating with one another over a communications medium, thus providing distributed functionality and allowing multiple clients to take advantage of the information-gathering capabilities of the server.

Client and server communicate with one another utilizing the functionality provided by a protocol layer. For example, Hypertext-Transfer Protocol (HTTP) is a common protocol that is used in conjunction with the World Wide Web (WWW). Typically, a computer network address such as a Universal Resource Locator (URL) or an Internet Protocol (IP) address is used to identify the server or client computers to each other. The network address can be referred to as a Universal Resource Locator address. For example, communication can be provided over a communications medium. In particular, the client and server may be coupled to one another via TCP/IP connections for high-capacity communication.

Thus, FIG. 2 illustrates an exemplary networked or distributed environment, with a server in communication with client computers via a network/bus, in which the present invention may be employed. In more detail, a number of servers 10a, 10b, etc., are interconnected via a communications network/bus 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to process, store or render secure content from a trusted source.

In a network environment in which the communications network/bus 14 is the Internet, for example, the servers 10 can be Web servers with which the clients 110a, 110b, 110c, 110d, 110e, etc. communicate via any of a number of known protocols such as HTTP. Servers 10 may also serve as clients 110, as may be characteristic of a distributed computing environment. Communications may be wired or wireless, where appropriate. Client devices 110 may or may not communicate via communications network/bus 14, and may have independent communications associated therewith. For example, in the case of a TV or VCR, there may or may not be a networked aspect to the control thereof. Each client computer 110 and server computer 10 may be equipped with various application program modules or objects 135 and with connections or access to various types of storage elements or objects, across which files may be stored or to which portion(s) of files may be downloaded or migrated. Thus, the present invention can be utilized in a computer network environment having client computers 110a, 110b, etc. that can access and interact with a computer network/bus 14 and server computers 10a, 10b, etc. that may interact with client computers 110a, 110b, etc. and other devices 111 and databases 20.

Rights Management (RM) Overview

Figure 3:
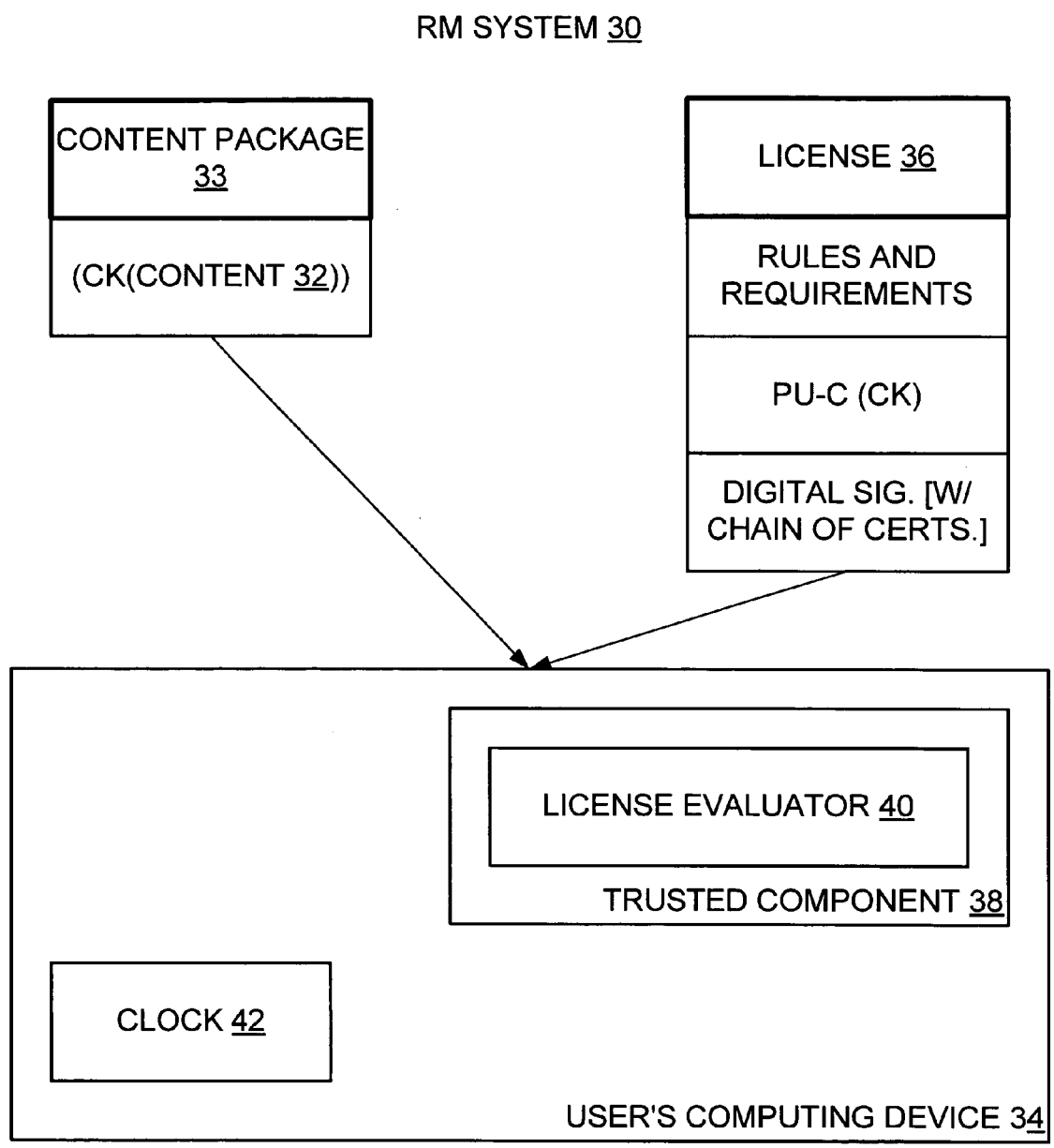
FIG. 3 is a block diagram showing an enforcement architecture of an example of a trust-based system, including a digital license for rendering corresponding digital content in accordance with various embodiments of the present invention.

As is known, and referring now to FIG. 3, rights management (RM) and enforcement is highly desirable in connection with digital content 32 such as digital audio, digital video, digital text, digital data, digital multimedia, etc., where such digital content 32 is to be distributed or redistributed to a user.

Upon being received by the user, such user renders the digital content 32 with the aid of an appropriate rendering device such as a media player, text displayer, etc. on a personal computer 34 or the like.

Typically, a content owner or developer or distributor (hereinafter 'distributor') distributing such digital content 32 wishes to restrict what the user can do with such distributed digital content 32, or at least ensure that the content 32 is not redistributed in an unwanted manner. For example, the content distributor may wish to restrict the user from copying and re-distributing such content 32 to a second user, or may wish to allow distributed digital content 32 to be rendered only a limited number of times, only for a certain total time, only on a certain type of machine, only on a certain type of rendering platform, only by a certain type of user, etc.

However, after distribution has occurred, such distributor has very little if any control over the digital content 32. An RM system 30, then, allows the controlled rendering of arbitrary forms of digital content 32, where such control is flexible and definable by the content distributor of such digital content. Typically, to protect the content 32, such content 32 is encrypted with a symmetric encryption/decryption content key (CK), (i.e., (CK(CONTENT))), and is packaged with other information relevant to the content 32 in a package 33.

The trust-based RM system 30 may allow a distributor of digital content 32 to specify at least some license rules that must be satisfied before such digital content 32 is allowed to be rendered by a computing device 34 of a user. Such license rules can include the aforementioned temporal requirement, and may be embodied within a digital license or use document (hereinafter 'license') 36 that the user/user's computing device 34 (hereinafter, such terms are interchangeable unless circumstances require otherwise) must possess. Such license 36 also includes the content key (CK) for decrypting the digital content 32, perhaps encrypted according to a key decryptable by the user's computing device 34. As seen in FIG. 3, such encrypting key is a public key of the user's computing device 34 (PU-C), and the user's computing device 34 presumably has the corresponding private key (PR-C) by which (PU-C(CK)) may be decrypted.

The content distributor for a piece of digital content 32 must trust that the user's computing device 34 will abide by the rules and requirements specified by such content owner in the license 36, i.e. that the digital content 32 will not be rendered unless the rules and requirements within the license 36 are satisfied. The user's computing device 34 should therefore be provided with a trusted component or mechanism 38 that will not render the digital content 32 except according to the license rules embodied in the license 36 associated with the digital content 32 and obtained by the user.

The trusted component 38 typically has a license evaluator 40 that determines whether the license 36 is valid, reviews the license rules and requirements in such valid license 36, and determines based on the reviewed license rules and requirements whether the requesting user has the right to render the requested digital content 32 in the manner sought, among other things. As should be understood, the license evaluator 40 is trusted in the RM system 30 to carry out the wishes of the owner of the digital content 32 according to the rules and requirements in the license 36, and the user should not be able to easily alter such trusted element for any purpose, nefarious or otherwise.

As should be understood, the rules and requirements in the license 36 might specify whether the user has rights to render the digital content 32 based on any of several factors, including who the user is, where the user is located, what type of computing device the user is using, what rendering application is calling the RM system 30, the date, the time, etc. In addition, the rules and requirements of the license 36 may limit the license 36 to a pre-determined number of renderings, or pre-determined rendering time, for example. Thus, the trusted component 38 may need to refer to a clock 42 on the computing device 34. If such clock 42 is provided, such clock 42 may be a secure clock 42 that cannot be tampered with by a user in an effort to overcome a temporal restriction of a license 36.

The rules and requirements may be specified in the license 36 according to any appropriate language and syntax. For example, the language may simply specify attributes and values that must be satisfied (DATE must be later than X, e.g.), or may require the performance of functions according to a specified script (IF DATE greater than X, THEN DO . . . , e.g.).

Upon the license evaluator 40 determining that the license 36 is valid and that the user satisfies the rules and requirements therein, the digital content 32 can then be rendered. In particular, to render the content 32, the content key (CK) is obtained from the license 36 and is applied to (CK(CONTENT)) from the content package 33 to result in the actual content 32, and the actual content 32 is then in fact rendered. As set forth above, the license 36 with (PU-C(CK)) in effect authorizes an entity in possession of (PR-C) to access (CK) and thereby access the content 32 encrypted according to such (CK), presuming of course that the entity abides by all conditions as set forth in the license 36.

Note that a license 36 typically includes a digital signature for authentication/validation purposes. Likewise, other forms of digital constructs such as a piece of digital content 32 may also have such a digital signature for authentication/validation purposes. As should be known, such a digital signature may be constructed based on a first key from a pair of asymmetric keys or from a symmetric integrity key, for example by performing some sort of hash on the underlying data to which the signature is attached and then encrypting the hash with the key. Thereafter, the signature is validated by applying the second key from the pair of asymmetric keys or the integrity key, again for example by decrypting the encrypted hash and comparing the decrypted hash to another hash of the underlying data to which the signature is attached. If the hashes match, it can be presumed that the underlying data has not been altered and the underlying construct therefore can be authenticated. Typically, an RM system 30 will not honor a license 36 or the like that is not authenticated.

Note, too, that in at least some RM systems 30, a license 36 is dispensed with, especially if forming and providing such a license 36 may not be feasible or necessary. For example, in an RM system 30 for distributing multiple streams of multimedia content 32 on a continuing basis, providing licenses 36 for each stream 32 may not be deemed necessary, especially if the license terms do not vary as between streams 32. In such a case, and presuming that each stream 32 has a different corresponding content key (CK), all that is necessary is that the content key (CK) for decrypting a particular stream 32 be returned upon request from a user requiring same.

Use of Licensed Content 32 without Identifying Same

As was set forth above, in connection with an RM system 30 such as that shown in FIG. 3, an end-user of such system 30 may prefer not to identify the content 32 to be consumed thereby, both to the licensor that provides the content key (CK) for decrypting such content 32, and also to those who may be able to access data maintained by such a licensor. That is, such a user as a matter of privacy may wish to request the content key (CK) to render a particular piece of content 32 without in fact identifying the content 32 to the licensor returning such content key (CK). Note that while not identifying the content 32, such user likely may nevertheless be required to identify oneself, especially if the nature of the system 30 so dictates. For example, the system 30 may require that the request from the user include a return address or another identification of the user, or that the request include some sort of payment vehicle which can be traced back to the user. It is to be understood, then, that the present invention is primarily directed to not identifying the content 32 that is the basis of a request from a user, and not to not identifying the user.

Figure 4:
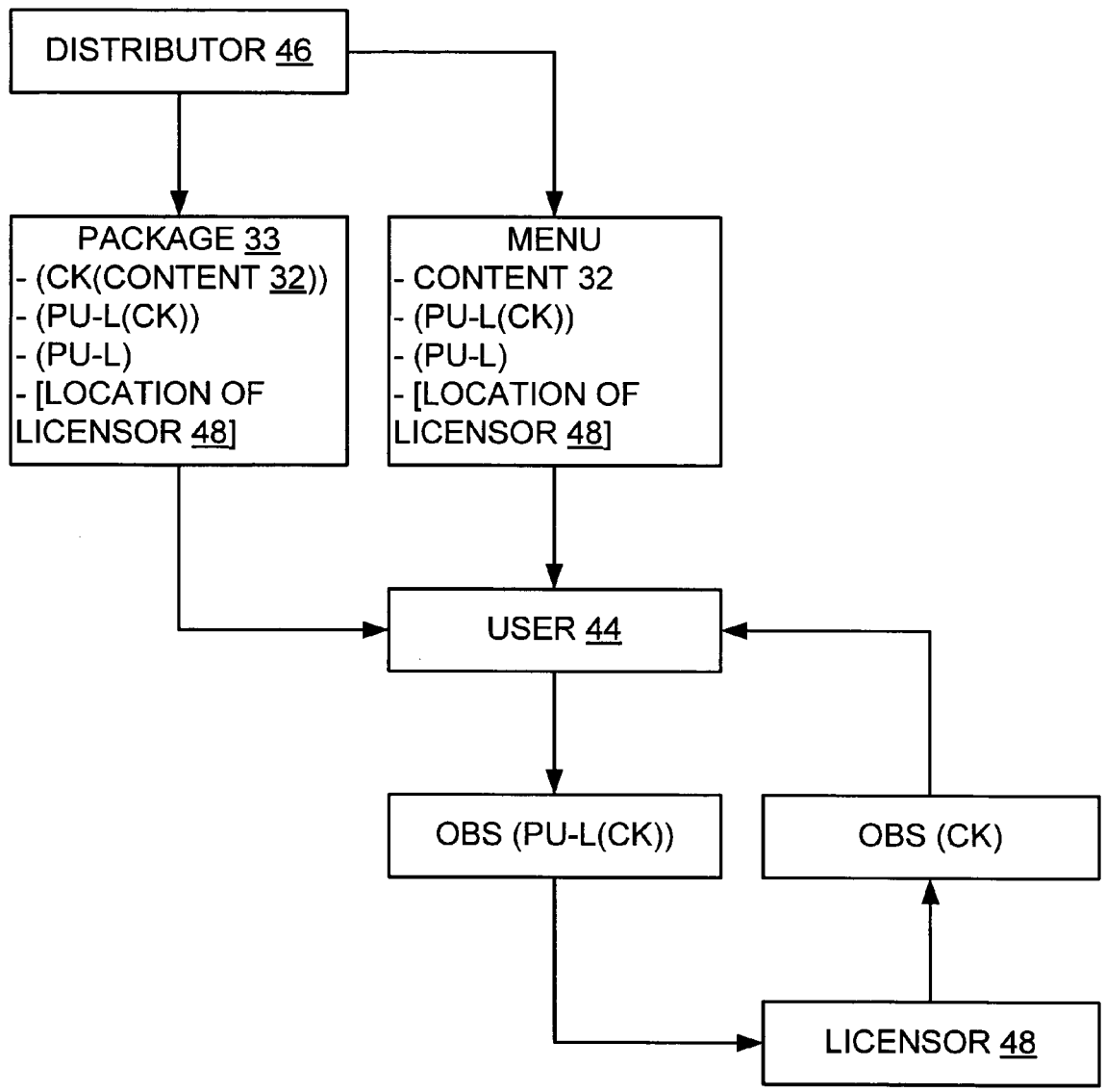
FIG. 4 is a block diagram showing an architecture that may employ the trust-based system of FIG. 3, and in particular shows a user receiving encrypted content from a distributor and obtaining a content key to decrypt the encrypted content from a licensor in accordance with one embodiment of the present invention.

To in fact allow the user to avoid identifying the content 32 either directly or indirectly upon requesting the licensor for the corresponding content key (CK), and in one embodiment the present invention, the content 32 as provided to or identified to the user includes the content key (CK) encrypted according to a public key of the licensor (PU-L) to result in (PU-L(CK)). That is, and turning now to FIG. 4, the content 32 itself as provided to the user 44 by a distributor 46 or the like includes therewith (PU-L(CK)), or else such distributor 46 or the like identifies the content 32 as being available, such as for example by way of a menu or the like, and along with such identification the distributor 46 includes therewith (PU-L(CK)). Thus, the content key (CK) can be obtained from such (PU-L(CK)) only upon the user 44 providing same to the licensor 48 as part of an appropriate request, inasmuch as only such licensor 48 can apply a corresponding private key (PR-L) to reveal (CK), as should be appreciated.

However, and again, the user 44 does not wish to allow the licensor 48 to gain knowledge of the content key (CK) inasmuch as such knowledge likely will allow the licensor 48 to identify the corresponding content 32. Accordingly, in one embodiment of the present invention, the user 44 prior to sending (PU-L(CK)) to the licensor 48 obscures same in such a way that the licensor 48 can apply (PR-L) to same to reveal an obscured version of (CK) that only the user can comprehend.

Figure 5:
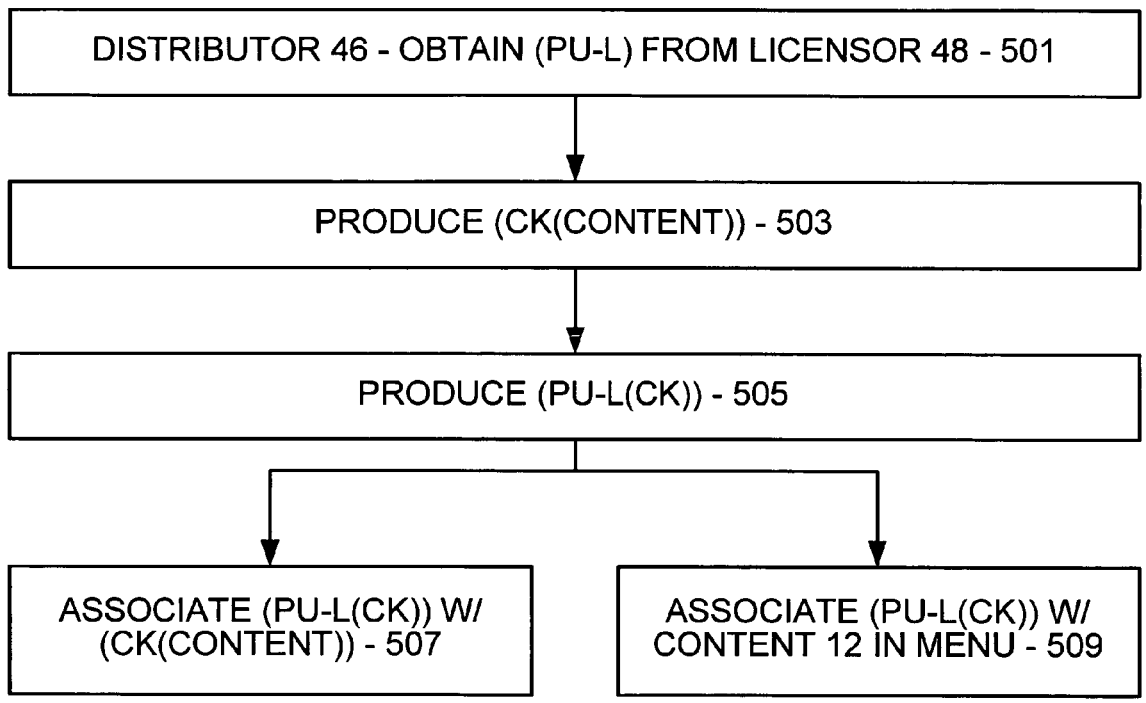
FIG. 5 is a flow diagram showing key steps performed by the distributor of FIG. 4 in the course of the preparing the encrypted content in accordance with one embodiment of the present invention.

More specifically, and turning now to FIG. 5, it is seen that in one embodiment of the present invention, the distributor 46 arranges with the licensor 48 to provide the content key (CK) to the user 44 for a particular piece of content 32, and in so doing the distributor 46 obtains from the licensor 48 the public key (PU-L) from a public-private key pair (PU-L, PR-L) owned by the licensor 48 (step 501). Of course, such public key (PU-L) is intended to be widely available, while the private key (PR-L) is closely held and known only to the licensor 48. In addition, the distributor 46 either encrypts the content 32 at issue with a particular content key (CK) or receives the content 32 as already encrypted with such (CK) to be in the form (CK(content)) (step 503). In either case, the distributor encrypts (CK) with (PU-L) to result in (PU-L(CK)) (step 505).

Thereafter, if distributing (CK(content)) to the user 44, such as for example in a file form, (PU-L(CK)) is associated with (CK(content)) (step 507), such as for example by being included within the same package 33. Likewise, if merely identifying the availability of (CK(content)) to the user 44, such as for example in a menu of streams available for rendering, (PU-L(CK)) is associated with the identification (step 509), such as for example by being visibly or non-visibly included with the identification on the menu. Note that in the latter case it may be advisable to also associate (PU-L(CK)) with (CK(content)) as at step 507, especially if the stream containing such (CK(content)) can be saved and later rendered.

Figure 6:
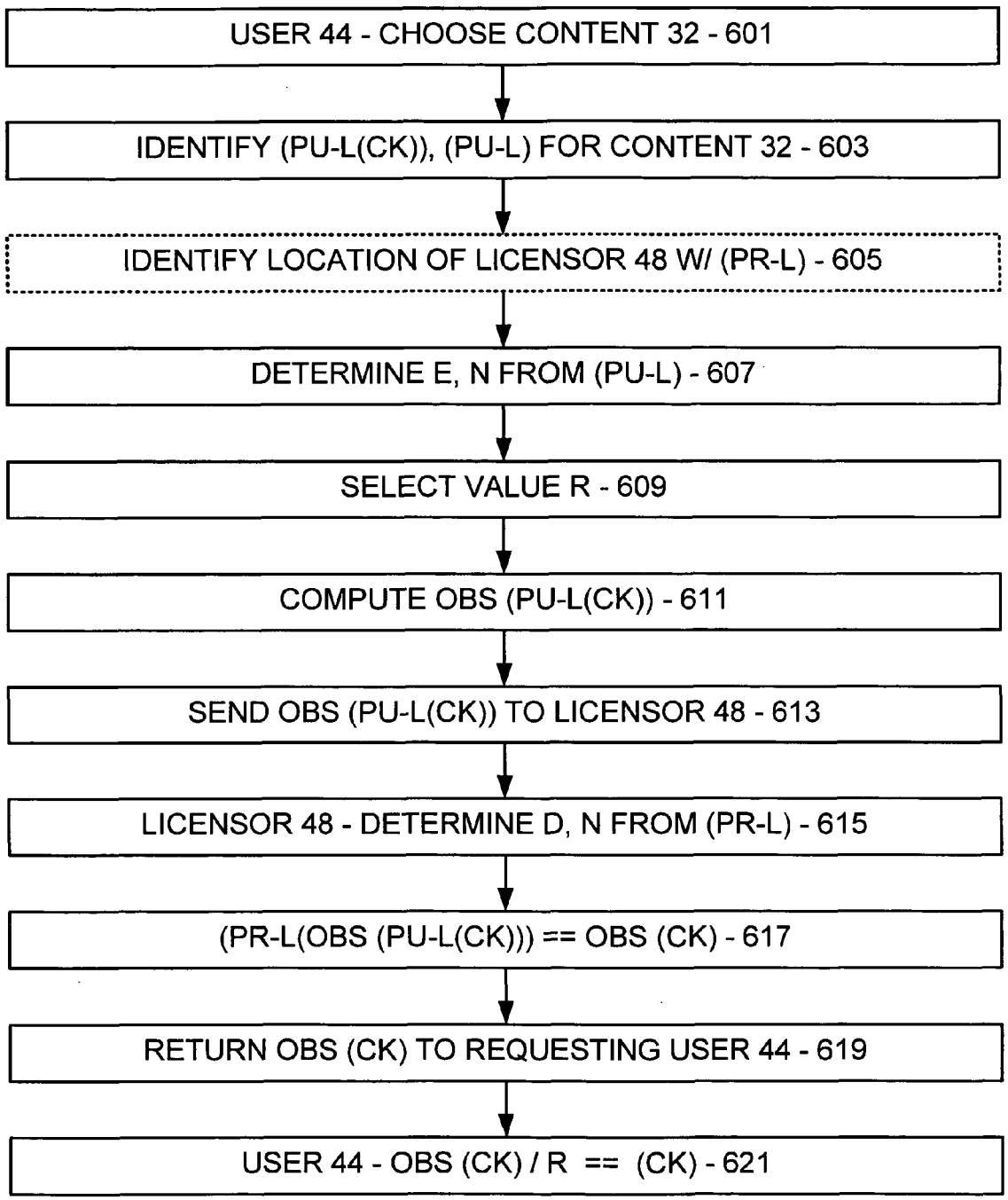
FIG. 6 is a flow diagram showing key steps performed by the user and licensor of FIG. 4 in the course of the user obtaining the content key in accordance with one embodiment of the present invention.

In either case, and turning now to FIG. 6, upon encountering the package 33 with (CK(content)) and (PU-L(CK)) of step 505 of FIG. 5 or the like and deciding to render the content 32 thereof, or upon encountering and choosing the content 32 from the menu of step 507 of FIG. 5 or the like with the associated (PU-L(CK)) (step 601), such (PU-L(CK)) and (PU-L) itself are identified (step 603). As may be appreciated, (PU-L) itself is likely found in some predetermined association with (PU-L(CK)), such as for example in an attached certificate or the like.

In addition, if necessary, a location at which the licensor 48 that own (PR-L) may be identified (step 605). As may be appreciated, the identification of the location of the licensor 48 may not be necessary if the user 44 expects the licensor 48 to be at a predetermined location. If necessary, such identification likely may be found in some predetermined association with (PU-L(CK)), such as for example the aforementioned attached certificate or the like.

At any rate, it is to be appreciated that public-private key cryptography is based on an algorithm such as the known RSA algorithm which takes two large primes, p and q, and computes their product n=pq, where n is to be employed as a modulus in performing modular mathematics. Thus, with n, a number e is chosen to be less than n and relatively prime to (p−1)(q−1), which means e and (p−1)(q−1) have no common factors except 1. Thereafter, another number d is chosen such that (ed−1) is divisible by (p−1)(q−1). As should be understood, the values e and d are employed as public and private exponents, respectively, with the result being that the pair (n, e) are referred to as the public key (PU) and the pair (n, d) are referred to as the private key. Note there that once n, d, and e are arrived at, the factors p and q are no longer necessary and may be destroyed or kept with the private key.

The public key (PU)/(n, e) may be widely distributed, while the private key (PR)/(n, d) and especially the private exponent d are typically closely held as a secret by an owner of such public-private key pair (PU, PR). Significantly, if an interested party with knowledge of (PU)/(n, e) wishes to encrypt some piece of data m so that only the aforementioned owner with knowledge of (PR)/(n, d) can decrypt same, such interested party according to the aforementioned algorithm would compute a cipher text c by exponentiation and modular mathematics:

$$c = m^e \bmod n$$

where e and n are from (PU). Such exponentiation and modular mathematics are known to the relevant public and need not be set forth herein in any detail.

With c as computed to encrypt m, then, the interested party would send c to the owner of (PR), and such owner would then decrypt c to reveal m by similar exponentiation and modular mathematics:

$$m = c^d \bmod n$$

where d and n are from (PR). That is, such encryption and decryption are based on the known property of the aforementioned e, d, and n as calculated that:

$$m = (m^e \bmod n)^d \bmod n.$$

Note here that in a similar manner:

$$m = (m^d \bmod n)^e \bmod n,$$

whereby the owner can send a piece of data m encrypted according to (PR) to an interested party that in turn can decrypt same according to (PU).

As may be appreciated, public-private key cryptography and the aforementioned algorithm are based on the fact that it is exceedingly difficult to obtain the private exponent d from the public key (n, e) unless one can factor n into p and q.

However, such factoring is itself also exceedingly difficult, especially as n becomes large.

Based on the aforementioned public-private cryptography algorithm and properties, then, and in one embodiment of the present invention, the user 44 sends (PU-L(CK)) to the licensor 48 to obtain (CK) therefrom, but prior to doing so such user 44 obscures such (PU-L(CK)) by determining e and n from the public key (PU-L) of the licensor 48 (step 607), picking a value R between 1 and n (step 609), computing:

$$Y = R^e \bmod n,$$

and multiplying (PU-L(CK)) by Y to result in such (PU-L(CK)) being obscured (i.e. 'Obs (PU-L(CK))') (step 611). Note here that R may be a random value or may be another value selected by the user or the like, where R is not to be known by the licensor 48. Critically, it is to be appreciated that such multiplication is in effect:

$$Obs(PU\text{-}L(CK)) = R^e \bmod n * (CK^e \bmod n) \bmod n,$$

which mathematically reduces to:

$$Obs(PU\text{-}L(CK)) = (R^e * CK^e) \bmod n,$$

and which further mathematically reduces to:

$$Obs(PU\text{-}L(CK)) = (R*CK)^e \bmod n.$$

At any rate, the user 44 then requests (CK) from the licensor 48 by sending Obs (PU-L(CK)) to the licensor 48 at the location thereof (step 613), perhaps along with some form of payment or other remuneration for being provided with the content key (CK) to decrypt the corresponding encrypted content 32 (CK(content)). At this point, then, the licensor 48 has Obs (PU-L(CK)), and likely has some identification of the user 44, perhaps from a return address, from the payment, or the like. Critically, though, the licensor 48 has no identification of the content 32 or of the content key (CK), from which the content 32 may be identified, and thus the content 32 that is the basis of the request is not identified to the licensor 48.

To continue, then, with Obs (PU-L(CK)) as set forth above, the licensor 48 applies the corresponding private key (PR-L) to same to reveal an obscured version of (CK) that only the user can comprehend. In particular, the licensor 48 determines d and n from (PR-L) (step 615) and based thereon computes (PR-L(Obs (PU-L(CK)))) as:

$$(PR\text{-}L(Obs(PU\text{-}L(CK)))) = (Obs(PU\text{-}L(CK)))^d \bmod n,$$

(step 617). Critically, it is to be appreciated that such equation is in effect:

$$(PR\text{-}L(Obs(PU\text{-}L(CK)))) = ((R*CK)^e \bmod n)^d \bmod n,$$

which mathematically reduces to:

$$(PR\text{-}L(Obs(PU\text{-}L(CK)))) = (R*CK) \bmod n,$$

and which further may be restated as thematically reduces to:

$$Obs(CK) = (R*CK) \bmod n.$$

That is, by applying (PR-L) to the obscured (PU-L(CK)), the licensor results in (CK) obscured by R (i.e., Obs (CK)). At this point, then, and again critically, the licensor 48 is in possession of Obs (CK) but cannot derive (CK) without R, and thus again has no identification of the content 32 or of the content key (CK), from which the content 32 may be identified, and thus the content 32 that is the basis of the request is still not identified to the licensor 48.

To continue, the licensor 48 with Obs (CK) returns same to the requesting user 44 (step 619). Note here that although not encrypted by (PU-L), (CK) is nevertheless hidden during transmission to the user 44 inasmuch as such (CK) is in the obscured form of Obs (CK) and cannot be revealed without knowledge of R. At any rate, the user 44 upon receiving Obs (CK) retrieves (CK) therefrom based on having such knowledge of R by in effect dividing Obs (CK) by R (step 621). In particular:

$$Obs(CK)/R = (R*CK) \bmod n * (1/R) \bmod n,$$

which is $$Obs(CK)/R = (R*(1/R)*CK) \bmod n,$$

which is $$Obs(CK)/R = (CK) \bmod n,$$

which is $$Obs(CK)/R = (CK).$$

As should now be appreciated, with such (CK), the user may then apply same to (CK(content)) to reveal the content 32 and render same. To summarize, then, by employing the method shown in FIG. 6, the user 44 prior to sending (PU-L(CK)) to the licensor 48 obscures same in such a way that the licensor 48 can apply (PR-L) to same to reveal an obscured version of (CK) that only the user can comprehend. Significantly, inasmuch as the licensor 48 has no knowledge of the value R, such licensor 48 should not be able to deduce the content 32 that is the basis of the request from the user 44, and such content 32 is thus not identified to the licensor 48, barring of course other external factors that could be employed to identify the content 32 to the licensor 48.

It is to be appreciated that based on the content 32 not being identified to the licensor 48, the licensor 48 in performing the method set forth in connection with FIG. 5 cannot without more information perform any administrative functions with regard to each piece of content 32. For example, any payment or remuneration received in connection with a request cannot be allocated to any particular piece of content 32. In a similar manner, different pieces of content 32 cannot have different payment/remuneration values inasmuch as each request presumably would have to be handled in a common manner, including receiving a common payment/remuneration value.

Accordingly, in one embodiment of the present invention, to in fact have different payment/remuneration values for different pieces of content 32, each piece of content 32 is encrypted according to multiple content keys (CK1, CK2, etc.). Accordingly, if a particular piece of content 32 is encrypted according to 5 content keys (CK1-CK5), the user 44 would be required to request each of the content keys (CK1-CK5), with each request having a common payment/remuneration value, thus resulting in 5 payments/remunerations in total. Likewise, if a particular piece of content 32 is encrypted according to 7 content keys, 7 payments/remunerations would be required in total, and the like.

CONCLUSION

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the present invention, a system and method provide a user 44 with some measure of privacy by allowing such user 44 to request from a licensor 48 a content key (CK) for a piece of content 32 without identifying the content key (CK) or the content 32. The requesting user 44 sends to the licensor 48 as part of a request an encrypted form of the content key (CK) in an obscured form that is unrecognizable to the licensor 48 and yet that allows the licensor 48 to decrypt the encrypted content key (CK) into a decrypted yet still obscured form that remains unrecognizable to the licensor 48. Thus, although the licensor 48 decrypts same to result in the content key (CK), such decryption never results in the content key (CK) in a form identifiable to the licensor 48. As a result, the licensor cannot associate the content key (CK) and by extension the requesting user to a particular piece of content 32. Nevertheless, the licensor 48 can note that the requesting user 44 did in fact obtain a content key (CK) for some piece of content 32.

It should be appreciated that changes could be made to the embodiments described above without departing from the inventive concepts thereof. Most notably, although the present invention is set forth in terms of public-private cryptography, other forms of cryptography may also be employed without departing from the spirit and scope of the present invention. It should be understood, therefore, that this invention is not limited to the particular embodiments disclosed, but it is intended to cover modifications within the spirit and scope of the present invention as defined by the appended claims.

The invention claimed is:

1. A method in connection with a piece of encrypted digital content, the method for a user to obtain a content key (CK) for decrypting the encrypted digital content, the method comprising:
    obtaining, by a first computing device, content encrypted with a content key, the content key encrypted with a public key of a licensor, and the public key of the licensor from a distributor's computing device;
    determining, by the first computing device, values including a public exponent e and modulus n from the public key of the licensor;
    selecting, by the first computing device, a value R;
    obscuring, by the first computing device, the content key encrypted with the public key of the licensor according to the public key of the licensor and the value R by computing Y using e and modulus n determined from the public key of the licensor, wherein Y is computed as Y=Re mod n, and multiplying the content key encrypted with the public key of the licensor by the computed Y to result in an obscured content key encrypted with the public key of the licensor;
    sending, by the first computing device, the obscured content key encrypted with the public key of the licensor Obs (PU-L(CK)) to the licensor's computing device;
    receiving, by the first computing device, obscured content key from the licensor's computing device, wherein the obscured content key is (R*CK) mod n and is derived from applying a private key of the licensor to the obscured content key encrypted with the public key of the licensor;
    obtaining, by the first computing device, the content key from the obscured content key by applying R to the obscured content key; and
    decrypting, by the first computing device, the content encrypted with the content key with the obtained content key.

2. The method of claim 1, wherein each piece of digital content is encrypted according to multiple content keys, further comprising requesting, by the first computing device, each of the multiple content keys for particular digital content, where different content requires different numbers of content keys and each request for a content key has a remuneration value.

3. The method of claim 2, wherein the content key is a symmetric content key.

4. The method of claim 3 further comprising the licensor applying the private key (PR-L) corresponding to the obscured content key encrypted with a public key Obs (PU-L(CKx)) to result in the obscured content key Obs (CKx), including:
    determining from the private key (PU-L) constituent values including a private exponent d and a modulus n;
    computing (PR-L(Obs (PU-L(CKx))) as:

$(PR\text{-}L(Obs(PU\text{-}L(CKx)))=(Obs(PU\text{-}L(CKx)))^d \bmod n$,
    whereby such $(PR\text{-}L(Obs(PU\text{-}L(CKx))))$ is $Obs$
    $(CKx)$, which is: $Obs(CKx)=(R*CKx)\bmod n$.

5. The method of claim 3, wherein the obtaining the symmetric content key (CKx) from the obscured content key Obs (CKx) is based on applying R thereto comprises dividing Obs (CKx) by R, including:

computing $Obs(CKx)/R$ as: $Obs(CKx)/R=(R*CKx)\bmod n*(1/R)\bmod n=(CKx)$.

6. The method of claim 3 further comprising applying the symmetric content key to the encrypted content and rendering the decrypted content.

7. The method of claim 2 further comprising obtaining the encrypted content from a package.

8. The method of claim 2 further comprising obtaining the encrypted content in a streamed form from the distributor.

9. A memory device having stored thereon computer-executable instructions for implementing method in connection with a piece of encrypted digital content, the method for a user to obtain a content key (CK) for decrypting the encrypted digital content, the instructions when executed by at least one processor causing the at least one processor to implement the method comprising:
    obtaining, by a first computing device, content encrypted with a content key, the content key encrypted with a public key of a licensor, and the public key of the licensor from a distributor's computing device;
    determining, by the first computing device, values including a public exponent e and modulus n from the public key of the licensor;
selecting, by the first computing device, a value R;
    obscuring, by the first computing device, the content key encrypted with the public key of the licensor according to the public key of the licensor and the value R by computing Y using e and modulus n determined from the public key of the licensor, wherein Y is computed as Y=Re mod n, and multiplying the content key encrypted with the public key of the licensor by the computed Y to result in an obscured content key encrypted with the public key of the licensor;
    sending, by the first computing device, the obscured content key encrypted with the public key of the licensor Obs (PU-L(CK)) to the licensor's computing device;
    receiving, by the first computing device, obscured content key from the licensor's computing device, wherein the obscured content key is (R*CK) mod n and is derived from applying a private key of the licensor to the obscured content key encrypted with the public key of the licensor;

obtaining, by the first computing device, the content key from the obscured content key by applying R to the obscured content key; and decrypting, by the first computing device, the content encrypted with the content key with the obtained content key.

10. The memory device of claim 9, wherein the method further comprises requesting each of multiple content keys used for encrypting particular digital content, where different content requires different numbers of content keys and each request for a content key has a remuneration value.

11. The memory device of claim 10, wherein the content key is a symmetric content key.

12. The memory device of claim 11, wherein the method further comprises the licensor applying the private key (PR-L) corresponding to the public key (PU-L) to the obscured content key encrypted with a public key Obs (PU-L(CKx)) to result in the obscured content key Obs (CKx), including:

determining from the private key constituent values including a private exponent d and a modulus n;

computing (PR-L(Obs (PU-L(CKx))) as:

$(PR\text{-}L(Obs(PU\text{-}L(CKx)))) = (Obs(PU\text{-}L(CKx)))^d \bmod n$, whereby such $(PR\text{-}L(Obs(PU\text{-}L(CKx))))$ is $Obs(CKx)$, which is: $Obs(CKx) = (R*CKx) \bmod n$.

13. The memory device of claim 11, wherein the obtaining the content key (CKx) from the obscured content key Obs (CKx) is based on applying R thereto comprises dividing Obs (CKx) by R, including:

computing $Obs(CKx)/R$ as: $Obs(CKx)/R = (R*CKx) \bmod n * (1/R) \bmod n = (CKx)$.

14. The memory device of claim 11, wherein the method further comprises applying (CKx) to the encrypted content and rendering the decrypted content.

15. The memory device of claim 10, wherein the method further comprises obtaining the encrypted content from a package.

16. The memory device of claim 10, wherein the method further comprises obtaining the encrypted content in a streamed form from a distributor.

* * * * *